United States Patent
Moxon (10) Patent No.: US 9,483,058 B2
(45) Date of Patent: Nov. 1, 2016

(54) AIRCRAFT CONTROL METHOD

(71) Applicant: ROLLS-ROYCE PLC, London (GB)

(72) Inventor: Matthew Moxon, Leeds (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 14/733,228

(22) Filed: Jun. 8, 2015

(65) Prior Publication Data

US 2016/0004255 A1    Jan. 7, 2016

(30) Foreign Application Priority Data

Jul. 4, 2014    (GB) .................................. 1411975.4

(51) Int. Cl.
| | |
|---|---|
| *G05D 1/04* | (2006.01) |
| *G05D 1/06* | (2006.01) |
| *B64D 43/02* | (2006.01) |
| *G01C 23/00* | (2006.01) |
| *G05D 1/00* | (2006.01) |

(52) U.S. Cl.
CPC .............. *G05D 1/042* (2013.01); *B64D 43/02* (2013.01); *G01C 23/005* (2013.01); *G05D 1/0005* (2013.01); *G05D 1/0055* (2013.01); *G05D 1/0607* (2013.01)

(58) Field of Classification Search
CPC .. G05D 1/0055; G05D 1/042; G05D 1/0607; G05D 1/0005; B64D 43/02; G01C 23/005
See application file for complete search history.

(56) References Cited

U.S. PATENT DOCUMENTS

| | | | | |
|---|---|---|---|---|
| 4,007,892 A | * | 2/1977 | Tabor ..................... | B64D 27/00 244/2 |
| 5,574,647 A | * | 11/1996 | Liden ................... | G05D 1/0005 701/10 |
| 5,835,879 A | | 11/1998 | Bush | |
| 2012/0078450 A1 | * | 3/2012 | Marche ................ | G01C 23/005 701/6 |

(Continued)

FOREIGN PATENT DOCUMENTS

| | | |
|---|---|---|
| EP | 0236587 A2 | 9/1987 |
| EP | 2466568 A1 | 6/2012 |

(Continued)

OTHER PUBLICATIONS

User Manual for the Base of Aircraft Data (BADA); European Organisation for the Safety of Air Navigation; Revision 3.6, Jul. 2004, pp. 1-103.

(Continued)

*Primary Examiner* — Russell Frejd
(74) *Attorney, Agent, or Firm* — Oliff PLC (57) ABSTRACT

A computer-implemented method of controlling an aircraft including, determining whether a change in altitude at a predetermined thrust-setting can be performed, the determination including: determining a climb-requirement including initial and final altitudes and a required range of airspeeds at the final altitude; determining aircraft performance data including a thrust at the final altitude at the thrust-setting, an initial airspeed at the initial altitude and an aircraft total mass at the initial altitude; using the aircraft performance data to determine a final airspeed and drag at the final altitude if a change in altitude at the predetermined setting were performed; determining whether thrust at the final altitude at the thrust-settings and airspeed is greater than drag; and providing a signal indicating whether the calculated final airspeed falls within the required range of airspeeds, and whether the thrust at the final altitude and airspeed at the cruise thrust-setting is greater than drag.

20 Claims, 7 Drawing Sheets

(56) References Cited

U.S. PATENT DOCUMENTS

| | | |
|---|---|---|
| 2012/0158220 A1 | 6/2012 | Accardo et al. |
| 2013/0221164 A1* | 8/2013 | Klooster ............... G05D 1/0607 244/180 |
| 2015/0314884 A1* | 11/2015 | Johnson ................. B64D 43/02 701/14 |

FOREIGN PATENT DOCUMENTS

| | | |
|---|---|---|
| EP | 2631732 A1 | 8/2013 |
| EP | 2660563 A1 | 11/2013 |

OTHER PUBLICATIONS

Flight Crew Training Manual, Airbus A380, Aug. 16, 2011, pp. 1-307.

Naval Aviation Schools Command, "Fundamentals of Aerodynamics," Trainee Guide for Preflight C-9B-0020 Unit 1, Apr. 2008, pp. 1-229.

Nov. 10, 2015 Search Report issued in European Patent Application No. 15 17 0958, 2 pages.

Jan. 20, 2015 Search Report issued in British Patent Application No. 1411975.4, 1 page.

* cited by examiner

AIRCRAFT CONTROL METHOD

FIELD OF THE INVENTION

The present invention relates to a method of controlling an aircraft and a flight management system for an aircraft.

BACKGROUND TO THE INVENTION

A typical flight profile for a civil aircraft can be divided into three main phases of flight—takeoff/climb (in which the aircraft is ascending rapidly to reach a cruise altitude), cruise (in which the aircraft stays at an approximately constant relatively high altitude) and descent/landing (in which the aircraft descends from the cruise altitude to land at the destination).

The optimum altitude for the cruise phase (i.e. the altitude that will result in minimum fuel burn for a given flight) is dependent on several factors. Generally it is found that higher cruising altitudes are favourable with respect to fuel consumption per air-mile due to drag reduction brought about by reduced air density, and increased engine thermal efficiency brought about by reduced air temperature at high altitudes. Tailwinds and headwinds must also be taken into account. On the other hand, the increased engine power settings required to reach these high altitudes result in increased maintenance and fuel costs. These conflicting parameters produce a defined optimum cruise altitude for any given set of mission parameters (such as leg length, aircraft weight and aircraft type). The optimum cruise altitude may increase as the aircraft burns fuel, and thus becomes lighter. Ideally, it would be desirable to allow the aircraft to climb gradually during cruise as the aircraft becomes lighter (known as "cruise climb").

However, the ability of an aircraft to gradually reach higher altitudes is limited by the requirements of Air Traffic Control (ATC), which often clears aircraft into blocks of airspace 1000 feet high in altitude, requiring two such free blocks whenever an aeroplane is other than at a defined flight level (e.g. at an integer number of thousands of feet), such as when the aircraft is ascending or descending. ATC generally therefore requires the ascent to be made relatively quickly, to avoid the possibility of collisions between aircraft, and to clear one of the blocks in as short an amount of time as possible. This means that cruise-climb, though potentially desirable to the individual operator, is generally not permissible when flying in controlled airspace within the current ATC system. Currently, when in controlled airspace, aircraft ascend between flight levels at a substantially constant airspeed (known as step climb). In these circumstances, airspeed is normally measured in terms of one of Mach number, Equivalent airspeed (EAS) or Calibrated Airspeed (CAS). Aircraft speed is maintained during the ascent by increasing engine thrust. However, this limits the maximum attainable altitude, since ATC normally requires the aircraft to be capable of a step climb from any current altitude. In any event, in a modern aircraft, such aircraft manoeuvres may be carried out by an aircraft Flight Management System (FMS) or Autopilot.

Consequently, it is desirable to have an FMS which is capable of executing climbs to a higher altitude, while conforming to ATC requirements, and reducing fuel burn and engine wear. The present invention provides a computer implemented method of controlling an aircraft and an aircraft control system which seeks to provide such a system.

SUMMARY OF THE INVENTION

According to a first aspect of the present invention, there is provided a computer implemented method of controlling an aircraft, the method comprising the steps of:
determining whether a change in altitude at a predetermined thrust setting can be performed, the determination comprising:
determining a climb requirement comprising initial and final altitudes and a required range of airspeeds at the final altitude;
determining aircraft performance data comprising a thrust at the final altitude at the predetermined thrust setting, an airspeed at the initial altitude and an aircraft total mass at the initial altitude;
using the aircraft performance data to determine an airspeed and an drag at the final altitude if a change in altitude at the predetermined thrust setting were performed;
determining whether thrust at the final altitude at the predetermined thrust settings and airspeed is greater than drag; and
providing a signal indicating whether the calculated final airspeed falls within the required range of airspeeds, and whether the thrust at the final altitude and airspeed at the cruise predetermined thrust setting is greater than drag.

The inventors have determined that a change in altitude at a predetermined thrust setting could in some cases be utilised while conforming to ATC requirements. Such a change in altitude is known as a "zoom climb" where the change in altitude is a climb, since the speed of the aircraft is allowed to change as the aircraft climbs or descends, rather than maintaining speed at the speed prior to the commencement of the climb by changing engine thrust setting. Provided the final speed is within the predetermined range, and the thrust at the predetermined thrust setting at the final altitude and final airspeed exceeds drag (and so the aircraft is still controllable and capable of accelerating), the climb/descent should be acceptable within current ATC rules. This method of operation is thought to allow increased rates of climb, and may reduce fuel consumption and engine wear, thereby reducing overall costs of operation to the user.

The initial altitude may comprise the current altitude. The final altitude may comprise a specified flight level.

The required range of airspeeds at the final altitude may comprise a minimum airspeed which may for example comprise a low speed buffet boundary speed, or a minimum speed stable speed. The required range of airspeeds at the final altitude may also comprise a maximum speed at which the aircraft can be safely operated (e.g. $V_{MO}$ or $M_{MO}$). Alternatively, the required range of airspeeds at the final altitude may be selected by the pilot.

The airspeed at the initial altitude may be determined by an airspeed sensor. The airspeed at the initial and/or final altitude may be measured in terms of one or more of Indicated airspeed (IAS), Equivalent Airspeed (EAS), Calibrated Airspeed (CAS), True Airspeed (TAS), and Mach number (M or MN).

The predetermined engine thrust setting may be determined by one of a thrust lever resolver angle (TRA) sensor and a flight management system.

The step of using the aircraft performance data to determine a calculated final airspeed may comprise determining aircraft potential energy at the initial and final altitudes and aircraft kinetic energy at the initial altitude and initial airspeed, to determine aircraft kinetic energy at the final altitude.

The step of using aircraft performance data to determine a calculated final drag may comprise determining aircraft weight, altitude and speed at the final altitude to determine an aircraft coefficient of lift at the final altitude. The step of using aircraft performance data to determine a calculated final drag may comprise using the coefficient of lift at the final altitude and the speed at the final altitude to determine an aircraft coefficient of drag at the final altitude using a look-up table.

The method may further comprise determining whether aircraft performance during the climb at the cruise thrust settings is within predetermined limits.

The method may further comprise comparing fuel use during a climb at cruise thrust settings to fuel use during a climb at climb thrust settings, and providing a signal to indicate whether a climb at climb thrust settings would result in a fuel saving.

According to a second aspect of the present invention, there is provided a computerised flight management system for an aircraft, the flight management system comprising:
a flight controller configured to determine whether a change in altitude at a predetermined engine thrust setting can be performed, the determination comprising:
determining a climb requirement comprising initial and final altitudes and a required range of airspeeds at the final altitude;
determining aircraft performance data comprising a thrust at the final altitude at the predetermined thrust setting, an initial airspeed at the initial altitude and an aircraft total mass at the initial altitude;
using the aircraft performance data to determine an airspeed and aircraft drag at the final altitude if a change in altitude at the cruise thrust settings were performed;
determining whether thrust and airspeed at the final altitude at the predetermined thrust setting is greater than drag; and
providing a signal indicating whether the airspeed at the final altitude falls within the required range of airspeeds, and whether the thrust at the final altitude and airspeed at the predetermined thrust setting is greater than drag.

DETAILED DESCRIPTION

Figure 1:
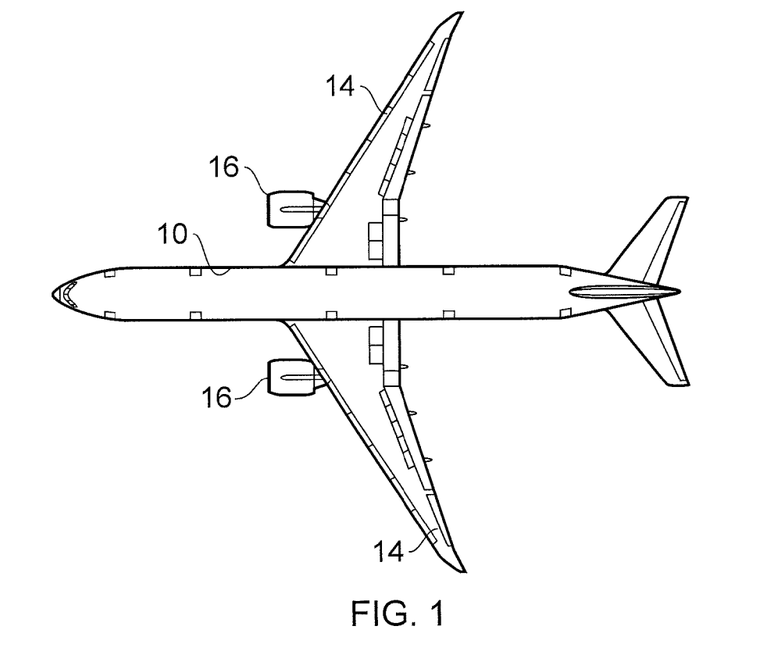
FIG. 1 shows a plan view of an aircraft in accordance with the present disclosure.
Figure 2:
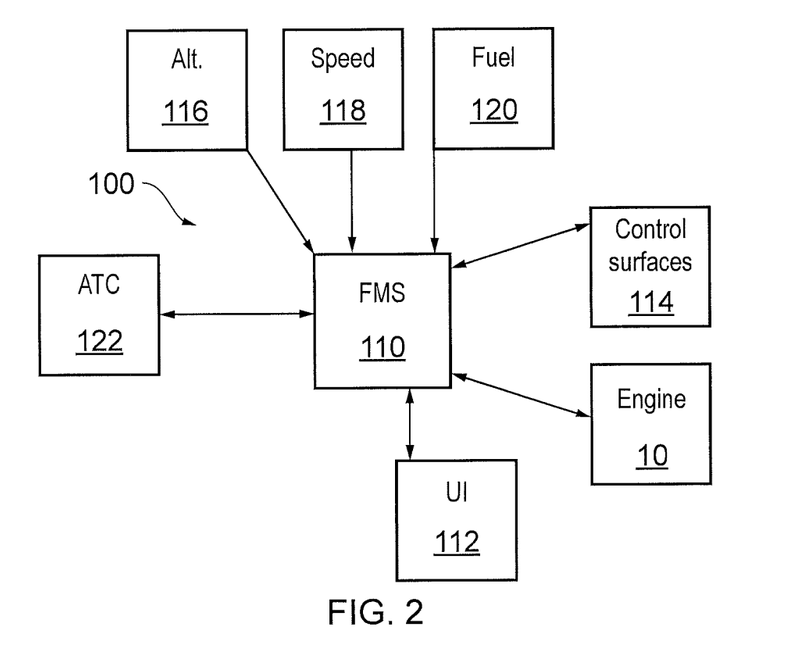
FIG. 2 shows a schematic view of an aircraft control system in accordance with the present disclosure.

FIG. 2 shows a schematic representation of an aircraft control system 100 in accordance with the present disclosure, suitable for an aircraft 10, shown in FIG. 1.

Aircraft 10 comprises a fuselage 12, wings 14, and a pair of engines 16. The engines 10 comprise gas turbine engines in the form of turbofans, but could comprise different engine types, such as piston engines or gas turbine engines driving a propeller. The aircraft shown in FIG. 1 comprises a Boeing 777, though the invention is suitable for different aircraft types, and is particularly suitable for high subsonic civil airliners.

The system 100 comprises a general purpose computer in the form of a Flight Management System (FMS 110). The FMS 110 comprises a general purpose computer comprising a processor (not shown), system memory (not shown) and machine readable instructions for carrying out a method in accordance with the herein described method of controlling an aircraft, and to control the aircraft 10 in accordance with this method.

The FMS 110 further comprises inputs and outputs in the form of data links. A first datalink is provided between a user interface 112 and the FMS 110. The user interface 112 provides indications to a user such as a pilot. The indications could include information such as flight modes currently in operation, as well as flight data, such as aircraft speed, altitude etc. as well as an indication whether a zoom climb can be performed. The user interface 112 also acts as an input, such that the pilot can input data such as a desired final altitude, desired final airspeed into the FMS 110. The user interface 112 may include a display monitor (not shown) for displaying output, and one or more input devices (such as keyboards etc.) for inputting data.

A second data link is provided between the FMS 110 and engine 10 for providing outputs to the engine 10 in the form of thrust lever resolver angle (TRA) commands to the engine 10, and for receiving inputs from the engine 10 in the form of current engine parameters, such as current thrust level (measured in terms of fan speed N1 or Overall Pressure Ration (OPR) for example), component temperatures (such as turbine entry temperature (TET)) etc. The FMS 110 therefore includes an autothrottle.

A third data link is provided between the FMS 110 and control surfaces 114 such as ailerons, elevators, flaps, rudder etc. Consequently, the FMS 110 is capable of controlling the aircraft 10 in flight.

Further data links are provided between the FMS 110 and aircraft data sensors. The aircraft data sensors include an altitude sensor 116 (which may for example comprise a static pressure sensor and/or a Global Navigation Satellite system such as a Global Positioning System (GPS) receiver or Inertial Navigation System (INS)), a speed sensor 118 (which may for example comprise a pitot tube and/or a GPS receiver or INS) and a fuel sensor 120. A further data link is also provided between the FMS 110 and a radio transceiver 122, which can be used to receive and transmit data between the aircraft 10 and an Air Traffic Controller (ATC).

Figure 3:
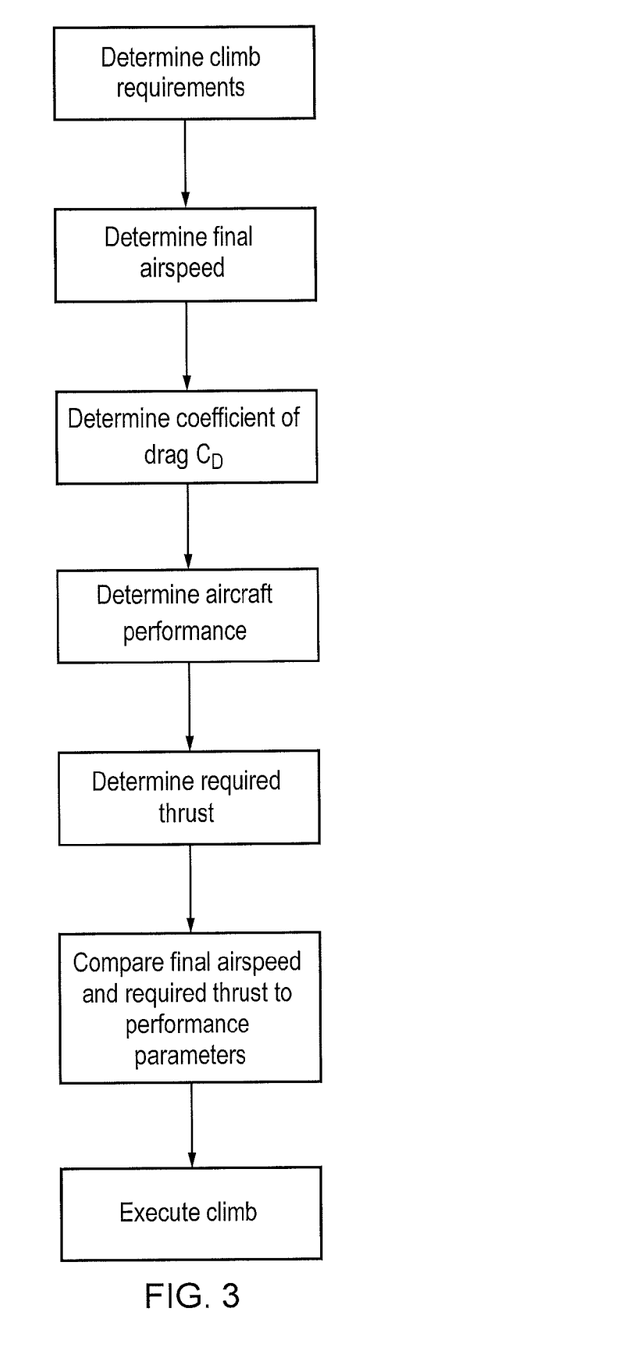
FIG. 3 shows a flow chart illustrating a method of controlling an aircraft in accordance with the present disclosure.

The FMS 110 can be used to perform a method of controlling the aircraft 10 in accordance with the present disclosure, in accordance with the following method steps.

The method generally beings with the aircraft in substantially level flight at high altitude and high speeds. These high altitudes and speeds may be achieved using a conventional climb.

In a first step, a climb requirement is determined. The climb requirement comprises a current altitude (as determined by the altitude sensor 116) and a final altitude (as determined either from signal from ATC via the radio transceiver 122, or as input by the pilot using user interface 112). For example, the climb requirement could be a climb from FL280 (i.e. an altitude of 28,000 feet) to FL300 (i.e. an altitude of 30,000 feet). The final altitude could be determined by a calculation carried out by the FMS, which determines whether a higher cruising altitude would result in a reduction in fuel consumption over the remainder of the flight. This calculation could be done on the basis of distance remaining for the current leg of the journey, current altitude, and current total weight in accordance with known methods. A climb requirement may exist only if it is determined that an available flight level above the current flight level will result in a fuel burn reduction.

A calculation is then made to determine whether the climb can be performed as a zoom climb, using a predetermined engine thrust setting, while remaining within required flight parameters. The engine predetermined thrust setting comprises the thrust setting (measured for example in terms of TRA) that is selected by the FMS at the initial altitude prior to the climb commencing, or may be measured by a TRA sensor. Generally, the FMS/autothrottle selects a thrust to achieve a target Mach number. In turn, the predetermined engine thrust setting may correspond to a fixed turbine entry temperature (TET) or a fixed engine shaft speed. Generally however, the actual thrust produced by the aircraft engines 16 at a given thrust setting will be dependent on the pressure altitude and airspeed of the aircraft 10.

In a second step, a lookup table or series of lookup tables are utilised to determine a final airspeed at the final altitude if the aircraft were to perform a zoom climb. These lookup tables may be stored in the FMS 110.

Figure 4:
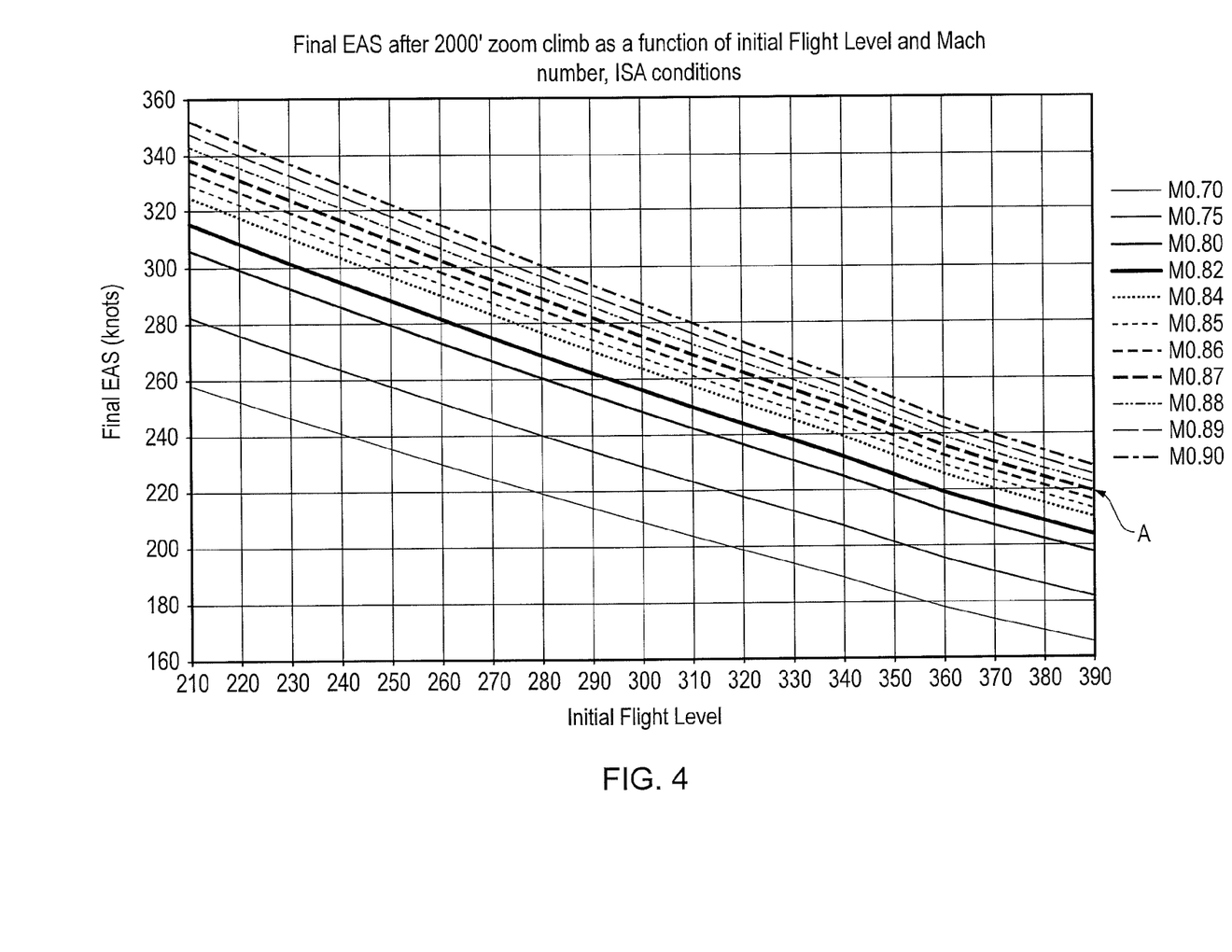
FIG. 4 shows an example look-up table relating initial and final altitudes, and initial and final flight speeds.

FIG. 4 shows an example first lookup table which relates initial airspeed and altitude to final airspeed and altitude for ISA conditions. Further equivalent lookup tables may be provided for different ambient conditions (i.e. atmospheric temperatures and/or pressure other than ISA conditions). In particular, each line represents an initial flight speed in terms of Mach number.

In one example, line A in FIG. 4 represents an initial flight speed of Mach 0.87. This relatively high initial airspeed is chosen, as it is close to the maximum safe speed, which therefore maximises kinetic energy for the climb. The final airspeed for a climb from a given initial altitude to a given final altitude (which in the example given is 2,000 feet above the initial altitude, though the difference between initial and final altitudes could in principle take any value) can be calculated by reading across from the point on the line A from the initial altitude. For example, from FIG. 4, at an initial speed of Mach 0.87 and an initial altitude of 28,000 feet (i.e. flight level 280), the final airspeed (in terms of EAS) at the end of a zoom climb to 30,000 feet (i.e. flight level 300) will be approximately 290 knots EAS.

Such lookup tables may be tabulated using experimental data from aircraft flights. Alternatively, the lookup tables can be calculated in accordance with the following method. As a further alternative, the FMS 110 may perform the following calculation using current aircraft data, instead of using precompiled lookup tables.

The final air speed at the final altitude can be calculated by considering the total kinetic energy (KE) that the aircraft has at the initial speed and altitude, as determined by the well-known relation (relation 1):

$$KE = \frac{1}{2}mv^2$$

Where m represents the total mass of the aircraft (as determined for example by consideration of the aircraft empty weight, fuel weight as determined by the fuel sensor 120 and cargo weight, as input using the UI 112). For the KE at the initial altitude, the speed at the initial altitude and mass at the initial altitude are considered. The mass at the final altitude may differ from that at the initial altitude, as fuel is burned.

The difference in gravitational potential energy (GPE) between the initial and final altitudes is then calculated using the well-known relation (relation 2):

$$\Delta GPE = \Delta(mgh)$$

Where m represents the total mass of the aircraft (again, the mass at the initial and final altitudes may be different), g represents the local acceleration due to gravity (which is generally constant at the levels at which commercial aircraft operation, approximately 9.8 m/s$^2$), and h represents the height of the aircraft above a given reference point (for example, sea level) in meters at the initial and final altitudes. h may be measured in terms of pressure altitude from a pressure sensor 116. Since GPE is dependent on geometric altitude, rather than pressure altitude (which may differ at non-ISA conditions), the height may be measured using a sensor which directly measures geometric altitude (such as INS or GPS). Alternatively, for a more accurate calculation, h could be determined in terms of geopotential meters, one geopotential meter being the change in height producing a change in GPE equal to 9.80665 J/kg. Geopotential altitude therefore takes into account the variation in g at different altitudes.

In a zoom climb at the predetermined thrust from static flight conditions, kinetic energy is exchanged for gravitational potential energy. By subtracting the difference in gravitational potential energy from the initial kinetic energy, a final kinetic energy can be determined. Relation 1 can then be used to determine a first approximation of the airspeed of the aircraft at the final altitude.

However, in a zoom climb at constant thrust, kinetic energy is added due to thrust from the engines, and subtracted due to drag from the air flowing past the wings and fuselage. Corrections to the final airspeed at the final altitude may therefore be required to obtain highly accurate results, though it is believed that such corrections are unnecessary for illustrative purposes within this disclosure, as thrust is broadly equivalent to drag during the climb, and the climb takes place relatively quickly.

In a third step, the aircraft performance at the final altitude is determined using a further series of lookup tables.

Figure 5:
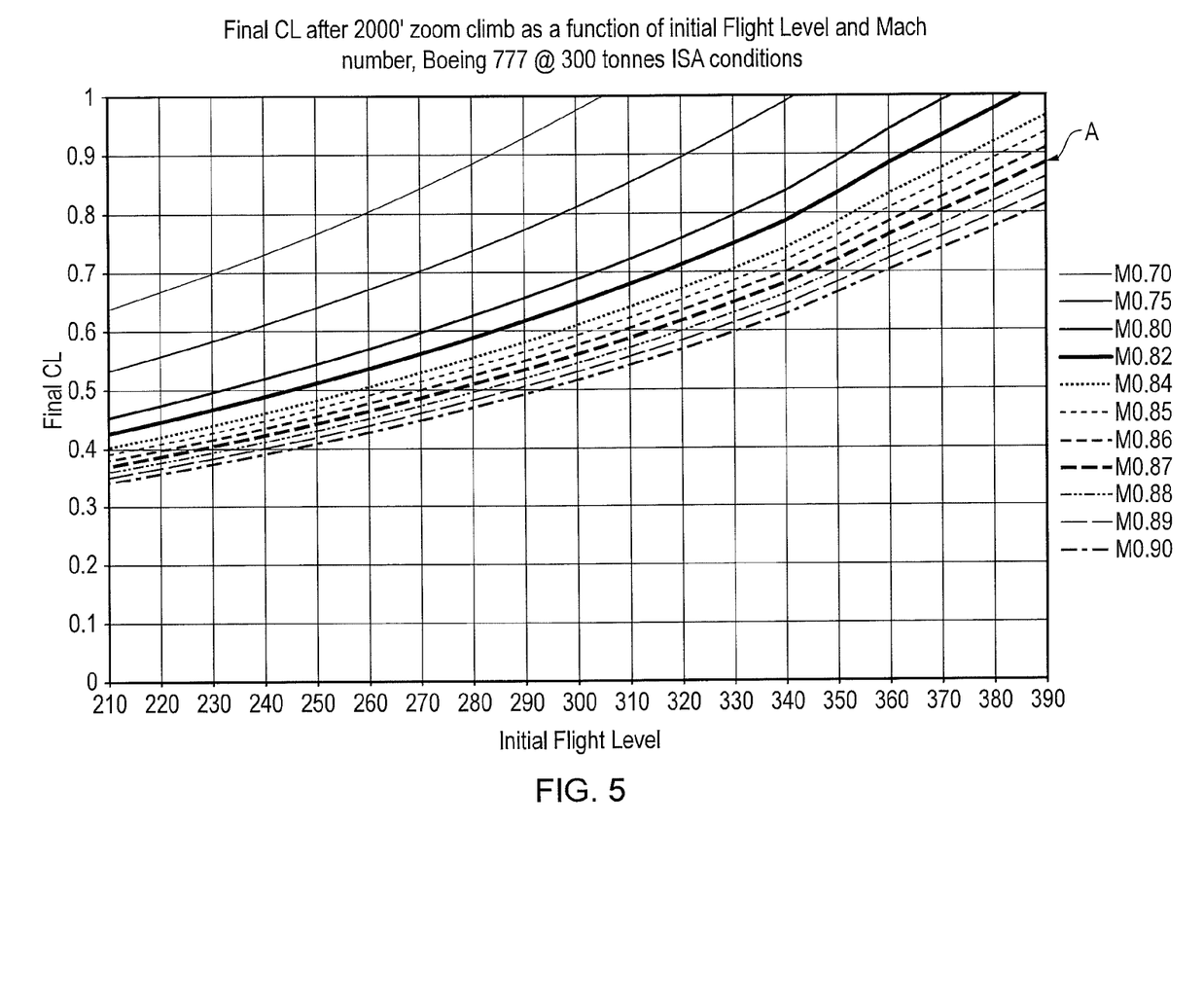
FIG. 5 shows an example look-up table relating initial and final altitudes, initial flight speeds, and corresponding final coefficients of lift for an example aircraft having a total weight of 200 metric tons.
Figure 6:
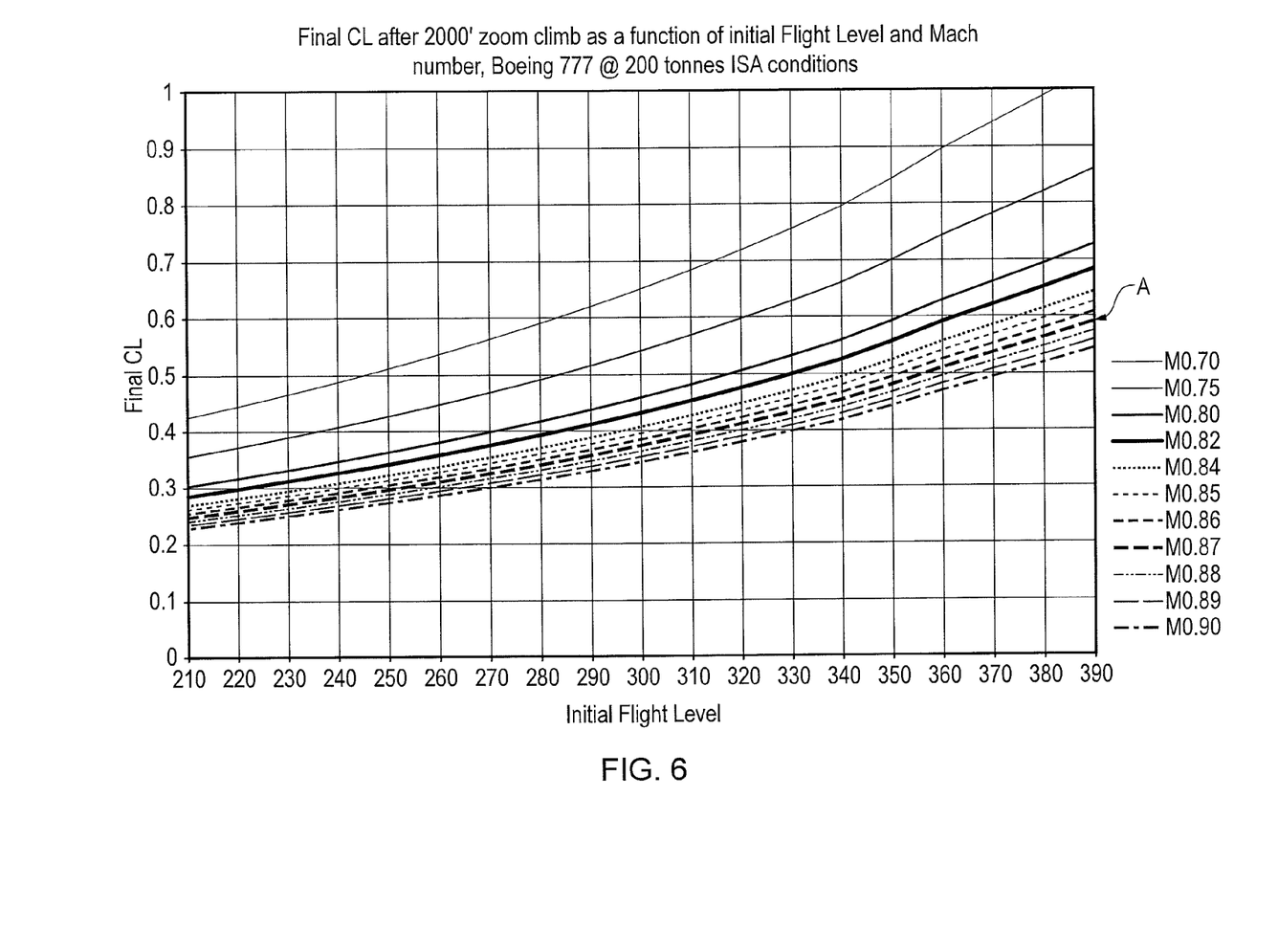
FIG. 6 shows an example look-up table relating initial and final altitudes, initial flight speeds, and corresponding final coefficients of lift for an example aircraft having a total weight of 300 metric tons.

FIGS. 5 and 6 show example second look-up tables for the fourth step, comprising relationships between initial speeds (again, in terms of Mach number) and altitude, and the coefficient of lift $C_L$ at the final altitude. $C_L$ is a dimensionless coefficient that relates lift generated by a lifting body to its size and the dynamic pressure of the flow around it. $C_L$ can be determined from these parameters, by for example using the well-known relation (relation 3):

$$C_L = \frac{2L}{\rho v^2 S}$$

Where L is the lift force (which at the beginning of the climb will be equal to the mass of the aircraft times the force of gravity), $\rho$ is the density of air at the given altitude, v is the current airspeed, and S is the wing area of the aircraft.

FIG. 5 relates to an example aircraft having a total mass of 200 metric tons (i.e. 200,000 kg), and FIG. 6 relates to the same aircraft having a total mass of 300 metric tons (i.e.

300,000 kg). The difference in mass is a consequence of different payload and/or fuel weights at the current aircraft conditions, and is determined by the FMS 110 on the basis of inputs from the fuel sensor 120 and the user interface 112.

For example, line A in FIG. 5 represents an initial flight speed of Mach 0.87. The initial altitude to a given final altitude (which in each case is 2,000 feet above the initial altitude) can be calculated be reading across from the point on the line A from the initial altitude. For example, from FIG. 5, at an initial speed of Mach 0.87 and an initial altitude of 28,000 feet (i.e. flight level 280), the final $C_L$ at the end of a zoom climb to 30,000 feet (i.e. flight level 300) will be approximately 0.5. Again, separate look up tables are provided for different weights and different atmospheric conditions.

Each look-up table can be tabulated experimentally, or determined by measurements of aircraft parameters. In particular, the look-up table values can be determined from aircraft total weight, aircraft altitude and airspeed.

Figure 7:
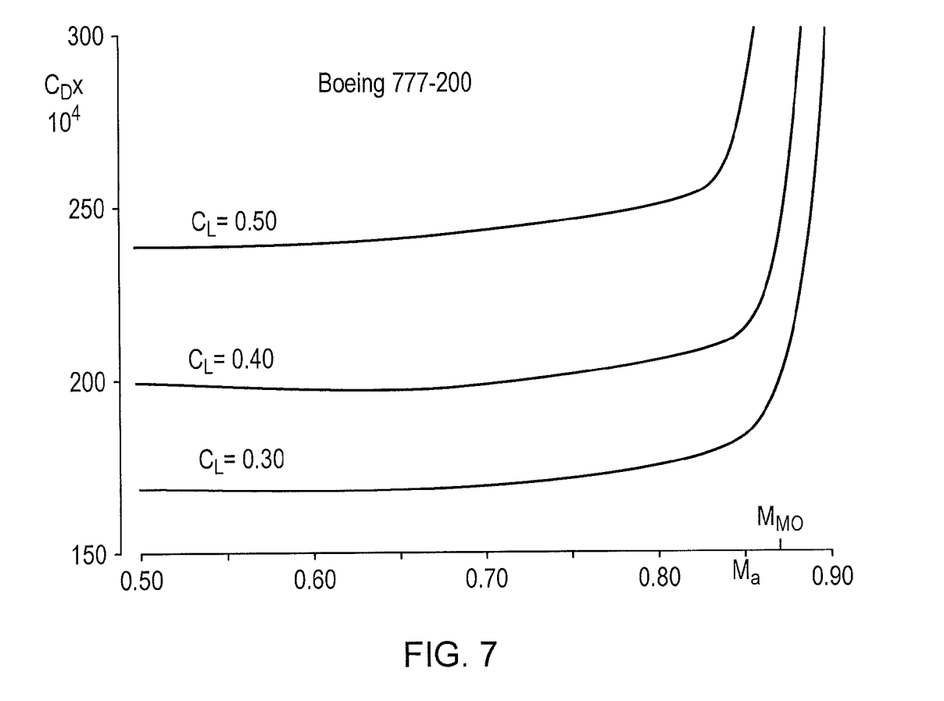
FIG. 7 shows a graph showing high speed drag characteristics for the aircraft.

In a fourth step, the coefficient of coefficient of drag $C_D$ can then be determined from the coefficient of lift $C_L$ determined in the fourth step using a further look-up table, which may be in the form of a graph showing drag characteristics for the aircraft. FIG. 7 is a graph showing the drag characteristics for the aircraft of FIG. 1 at high speeds. FIG. 7 is based on publically available data, and is sourced from Aerodynamic Design of Transport Aircraft, by Ed Obert (Delft University Press, 2009—ISBN 978-1-58603-970-7). FIG. 7 relates aircraft speed (in terms of Mach number Ma) to the coefficient of drag $C_D$ for various values of the coefficient of lift $C_L$, and is generally provided by the aircraft manufacturer. For example, where the coefficient of lift $C_L$ is determined in the fifth step to be 0.5, and the speed at the final altitude of 290 knots EAS (i.e. approximately 0.8 Mach number) the coefficient of drag $C_D$ will be approximately 0.0245.

In a fifth step, the thrust F required to maintain level flight (i.e. such that thrust is greater than drag) can be obtained using the well-known relation (relation 4):

$$F = \frac{1}{2}\rho v^2 C_D S$$

Where S represents the wing area of the aircraft, and v represents the aircraft speed at the final altitude.

Alternatively, the thrust F could again be determined from a look-up table which relates the coefficient of drag to required thrust.

In a sixth step, the results from the second and fifth steps (i.e. the speed and required thrust for sustained flight at the final altitude) are compared to required aircraft performance parameters. For example, the calculated speed at the final altitude may be compared to a range of speeds extending from a minimum to a maximum speed.

Figure 8:
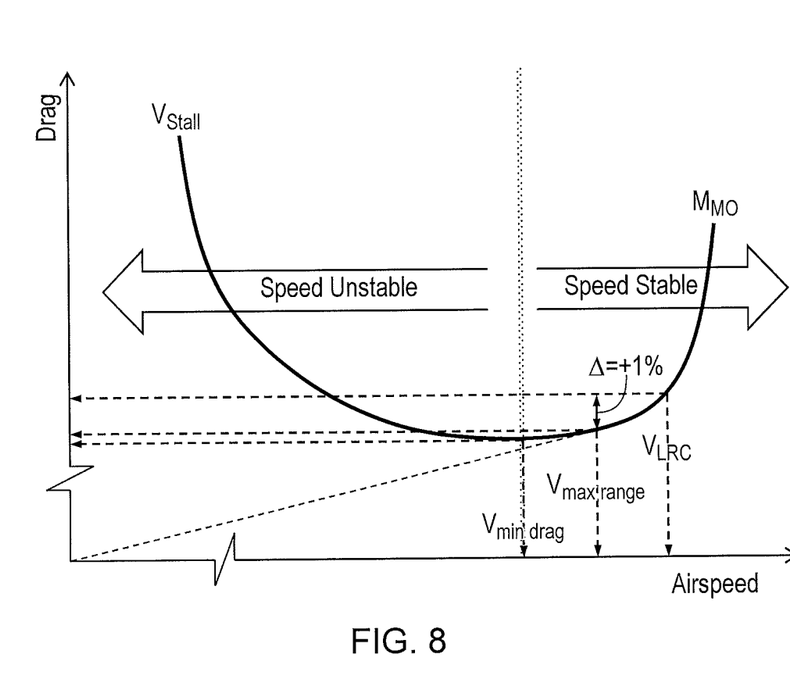
FIG. 8 shows a graph illustrating speed stability of the aircraft.

The minimum speed may for instance constitute the highest of a minimum speed at which the aircraft is speed stable at the final altitude, which may in turn comprise a minimum drag speed ($V_{min\ drag}$), and a buffet boundary speed at the current aircraft weight. FIG. 8 illustrates the concept of speed stability. As can be seen, where the aircraft is held in level flight and operated at speeds above the minimum drag speed ($V_{min\ drag}$), further increases in speed will increase drag. Consequently, at such speeds, aircraft drag has a restorative effect on aircraft speed, such that the increased drag at increased speeds will maintain the aircraft at a stable speed. However, at speeds below $V_{min\ drag}$, drag will increase as speed falls, so aircraft drag has a destabilising effect on aircraft speed. Consequently, at speeds below $V_{min\ drag}$, the aircraft will continue to decelerate until the aircraft stalls, unless thrust is increased or descent initiated. Buffet boundary speed can be calculated in accordance with a lookup table (providing by the airframe manufacturer for example), which relates buffet speed with pressure altitude, aircraft gross weight, and turbulence conditions.

The maximum speed may for instance constitute the lowest of a Maximum Operating Limit Mach ($M_{MO}$), and a maximum Operating Limit Equivalent Airspeed ($V_{MO}$). The $V_{MO}$ and $M_{MO}$ speeds are again provided by look-up tables and/or aircraft instruments, and vary in accordance with pressure altitude.

The required thrust for sustained flight at the final altitude may comprise the thrust that can be provided by the engines 10 at that altitude at the cruise thrust settings that were selected prior to the climb, at the initial altitude, which may in turn be provided from engine performance look-up tables. If both of these parameters are satisfied (i.e. calculated airspeed at the final altitude is above the minimum airspeed, and thrust at the final altitude at the predetermined thrust settings is sufficient to maintain speed), then a signal is provided by the UI 112 indicating that a zoom climb can be achieved.

In a seventh step, the FMS 110 controls the aircraft 10 to carry out the zoom climb. The zoom climb is performed from the initial altitude and speed by maintaining the engine thrust setting from the engines 10 at the predetermined level, and increasing the nose attitude using the elevators in order to increase the vertical velocity to achieve a climb. Once (or shortly before) the final altitude is reached, the elevators are again used to return the nose of the aircraft to an angle necessary to maintain level flight.

Optionally, the FMS 110 may also calculate the total fuel required for the zoom climb, and compare this to the total fuel required for a step climb. In each case, this can be calculated using knowledge of the thrust specific fuel consumption (SFC) of the engines, the thrust produced by the engines during the climb, and the distance travelled. If the FMS calculates that the zoom climb saves fuel, a zoom climb may be initiated.

Optionally, the FMS may also calculate the incremental cost of engine deterioration due to a conventional step climb and compare this with the engine deterioration caused by a zoom climb. It may be economically advantageous for operators to trade maintenance cost against fuel cost.

Prior to the zoom climb being initiated, ATC may be informed using radio transceiver 122, and a signal could be provided to the pilot to indicate that a zoom climb is to be carried out. This may be overridden by an input from the pilot using the user interface 112.

The method could be repeated as necessary throughout the flight cycle.

The above described method provides a method of operating an aircraft which complies with current ATC requirements (and so can be used in controlled airspace), yet provides significant advantages over prior climb/descent methods, in which airspeed is maintained at a substantially constant speed during the climb/descent. For example, the engine could be operated at a lower thrust setting, thereby reducing aircraft fuel consumption and reducing maintenance requirements. Where the engine comprises a turbine having a turbine tip clearance control mechanism (TCC), the turbine tip clearance can be maintained at a relatively close tip clearance during the cruise, as the tip clearances do not have to be held at a larger clearance to accommodate a sudden acceleration to achieve a step climb.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, a similar method could be utilised for descents.

In a zoom descent, the initial altitude represents a higher altitude than the final altitude. For example, the initial altitude could be 30,000 feet, and the final altitude could be 20,000 feet. Sudden changes in altitude may be necessary for example where meteorological conditions change rapidly during cruise. In such circumstances, the normal procedure would be to decrease engine thrust settings considerably (perhaps to flight idle), perform the descent, and then increase the engines again to a level required to maintain level flight at the lower altitude.

In this case, the thrust setting at the initial altitude could be adjusted, until the flight management computer indicates that the thrust is sufficient to ensure that flight remains within the required range of speeds at the final altitude.

The invention claimed is:

1. A computer implemented method of controlling an aircraft, the method comprising the steps of:
    determining whether a change in altitude at a predetermined engine thrust setting can be performed, the determination comprising:
    determining a climb requirement comprising initial and final altitudes and a required range of airspeeds at the final altitude;
    determining aircraft performance data comprising a thrust produced at the final altitude at the predetermined thrust setting, an airspeed at the initial altitude and an aircraft total mass at the initial altitude;
    using the aircraft performance data to determine an airspeed and a drag at the final altitude if a change in altitude at the predetermined engine thrust setting were performed;
    determining whether thrust and airspeed at the final altitude at the predetermined thrust setting is greater than drag; and
    providing a signal indicating whether the airspeed at the final altitude falls within the required range of airspeeds, and whether the thrust at the final altitude and airspeed at the predetermined thrust setting is greater than drag.

2. The method according to claim 1, wherein the required range of airspeeds at the final altitude comprises a minimum airspeed comprising the highest of a speed at which the aircraft is speed stable, and a minimum buffet speed.

3. The method according to claim 1, wherein the required range of airspeeds at the final altitude comprises the lowest of a maximum speed at which the aircraft can be safely operated, and a maximum Mach number at which the aircraft can be safely operated.

4. The method according to claim 1, wherein the airspeed at the initial and/or final altitude is measured in terms of one or more of Indicated airspeed (IAS), Equivalent Airspeed (EAS), Calibrated Airspeed (CAS), True Airspeed (TAS), and Mach number (Mn).

5. The method according to claim 1, wherein the predetermined engine thrust setting is determined by one of a thrust lever resolver angle (TRA) sensor and a flight management system.

6. The method according to claim 1, wherein the step of using the aircraft performance data to determine the airspeed at the final altitude comprises determining aircraft potential energy at the initial and final altitudes and aircraft kinetic energy at the initial altitude and initial airspeed, to determine aircraft kinetic energy at the final altitude.

7. The method according to claim 1, wherein the step of using aircraft performance data to determine the drag at the final altitude comprises determining aircraft weight, altitude and speed at the final altitude to determine an aircraft coefficient of lift at the final altitude.

8. The method according to claim 7, wherein the step of using aircraft performance data to determine the drag at the final altitude comprises using the coefficient of lift at the final altitude and the speed at the final altitude to determine an aircraft coefficient of drag at the final altitude using a look-up table.

9. The method according to claim 1, wherein the method comprises comparing fuel use during a climb at cruise thrust settings to fuel use during a climb at climb thrust settings, and providing a signal to indicate whether a climb at climb thrust settings would result in a fuel saving.

10. The method according to claim 1, wherein the method comprises the step of controlling the aircraft to climb in response to the signal with a computerized flight management system.

11. A computerized flight management system for an aircraft, the flight management system comprising:
    a flight controller configured to determine whether a change in altitude at a predetermined engine thrust setting can be performed, the determination comprising:
    determining a climb requirement comprising initial and final altitudes and a required range of airspeeds at the final altitude;
    determining aircraft performance data comprising a thrust produced at the final altitude at the predetermined thrust setting, an airspeed at the initial altitude and an aircraft total mass at the initial altitude;
    using the aircraft performance data to determine an airspeed and a drag at the final altitude if a change in altitude at the predetermined engine thrust setting were performed;
    determining whether thrust and airspeed at the final altitude at the predetermined thrust setting is greater than drag; and
    providing a signal indicating whether the airspeed at the final altitude falls within the required range of airspeeds, and whether the thrust at the final altitude and airspeed at the predetermined thrust setting is greater than drag.

12. The system according to claim 11, wherein the required range of airspeeds at the final altitude comprises a minimum airspeed comprising the highest of a speed at which the aircraft is speed stable, and a minimum buffet speed.

13. The system according to claim 11, wherein the required range of airspeeds at the final altitude comprises the lowest of a maximum speed at which the aircraft can be safely operated, and a maximum Mach number at which the aircraft can be safely operated.

14. The system according to claim 11, wherein the airspeed at the initial and/or final altitude is measured in terms of one or more of Indicated airspeed (IAS), Equivalent Airspeed (EAS), Calibrated Airspeed (CAS), True Airspeed (TAS), and Mach number (Mn).

15. The system according to claim 11, wherein the predetermined engine thrust setting is determined by a thrust lever resolver angle (TRA) sensor.

16. The system according to claim 11, wherein using the aircraft performance data to determine the airspeed at the final altitude comprises determining aircraft potential energy at the initial and final altitudes and aircraft kinetic energy at the initial altitude and initial airspeed, to determine aircraft kinetic energy at the final altitude.

17. The system according to claim 11, wherein using aircraft performance data to determine the drag at the final altitude comprises determining aircraft weight, altitude and speed at the final altitude to determine an aircraft coefficient of lift at the final altitude.

18. The system according to claim 17, wherein using aircraft performance data to determine the drag at the final altitude comprises using the coefficient of lift at the final altitude and the speed at the final altitude to determine an aircraft coefficient of drag at the final altitude using a look-up table.

19. The system according to claim 11, wherein the flight controller is configured to compare fuel use during a climb at cruise thrust settings to fuel use during a climb at climb thrust settings, and provide a signal to indicate whether a climb at climb thrust settings would result in a fuel saving.

20. The system according to claim 11, wherein the flight controller is configured to control the aircraft to climb in response to the signal.

* * * * *